(12) United States Patent
Inoue

(10) Patent No.: US 7,110,595 B2
(45) Date of Patent: Sep. 19, 2006

(54) METHOD OF AND APPARATUS FOR IMAGE PROCESSING, AND COMPUTER PRODUCT

(75) Inventor: Yuuki Inoue, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 725 days.

(21) Appl. No.: 10/310,548

(22) Filed: Dec. 5, 2002

(65) Prior Publication Data

US 2003/0128379 A1    Jul. 10, 2003

(30) Foreign Application Priority Data

| Dec. 7, 2001 | (JP) | ............................. 2001-374923 |
| Apr. 15, 2002 | (JP) | ............................. 2002-112455 |
| Nov. 11, 2002 | (JP) | ............................. 2002-327446 |

(51) Int. Cl.
G06K 9/00 (2006.01)
G03H 1/00 (2006.01)
G02B 5/12 (2006.01)

(52) U.S. Cl. ....................... 382/163; 382/162; 382/167; 359/1.9; 359/518

(58) Field of Classification Search ................ 382/162, 382/163, 164, 165, 167; 358/1.9, 518, 531, 358/474, 515, 529, 448, 517; 347/15, 41, 347/43

See application file for complete search history.

(56) References Cited

U.S. PATENT DOCUMENTS

| 4,985,759 A | * | 1/1991 | Ito ............................. 358/529 |
| 5,113,248 A | * | 5/1992 | Hibi et al. .................. 358/501 |
| 5,121,195 A | * | 6/1992 | Seki et al. .................. 358/515 |
| 5,136,401 A | * | 8/1992 | Yamamoto et al. ......... 358/474 |
| 5,177,603 A | * | 1/1993 | Kojima ....................... 358/518 |
| 6,025,862 A | | 2/2000 | Thompson .................. 347/232 |
| 6,164,745 A | * | 12/2000 | Nagoshi et al. ............... 347/15 |
| 6,396,505 B1 | * | 5/2002 | Lui et al. .................... 345/613 |
| 6,531,258 B1 | * | 3/2003 | Rieger et al. ............... 430/263 |
| 6,663,951 B1 | * | 12/2003 | Johnson ...................... 428/324 |

FOREIGN PATENT DOCUMENTS

| JP | 8-76538 | 3/1996 |
| JP | 8-96114 | 4/1996 |
| JP | 2000318219 | 11/2000 |
| JP | 200130476 | 2/2001 |
| JP | 2001117172 | 4/2001 |
| JP | 2001194855 | 7/2001 |
| JP | 2001197324 | 7/2001 |
| JP | 2002185791 | 6/2002 |

OTHER PUBLICATIONS

Deke McClelland (Feb. 1998) "the Great and Mysterious Alpha Channel Explained—The Practical Theory Behind Using Mask Channels In Photoshop", Macworld, PC World Communications, pp. 119-123.

* cited by examiner

*Primary Examiner*—Anh Hong Do
(74) *Attorney, Agent, or Firm*—Cooper & Dunham LLP

(57) ABSTRACT

Data containing at least a chroma component is obtained from an image data. Monochrome image data is generated from the chroma component image data. Which hue is to be output as it is specified, for example, by an operator. From the monochrome image data, the monochrome image data that corresponding to a portion of the colored image that has the specified hue is removed to obtain image eliminated data. The image eliminated data and the image data corresponding to a portion of the colored image that has the specified hue are combined to obtain an image processed data. The image processed data is converted into data that can be printed with a color printer.

19 Claims, 15 Drawing Sheets

FIG. 6

$$\begin{bmatrix} Y \\ Cb \\ Cr \end{bmatrix} = \begin{bmatrix} 0.299 & 0.587 & 0.144 \\ 0.172 & -0.339 & 0.511 \\ 0.511 & -0.428 & -0.083 \end{bmatrix} \begin{bmatrix} R \\ G \\ B \end{bmatrix}$$

FIG. 7

$$\begin{bmatrix} Y \\ 0 \\ 0 \end{bmatrix} = \begin{bmatrix} 1.0 & 0.0 & 0.0 \\ 0.0 & 0.0 & 0.0 \\ 0.0 & 0.0 & 0.0 \end{bmatrix} \begin{bmatrix} Y \\ Cb \\ Cr \end{bmatrix}$$

FIG. 8

$$\begin{bmatrix} R \\ G \\ B \end{bmatrix} = \begin{bmatrix} 1.000 & 0.000 & 1.371 \\ 1.000 & -0.698 & -0.366 \\ 1.000 & 1.732 & 0.000 \end{bmatrix} \begin{bmatrix} Y \\ Cb \\ Cr \end{bmatrix}$$

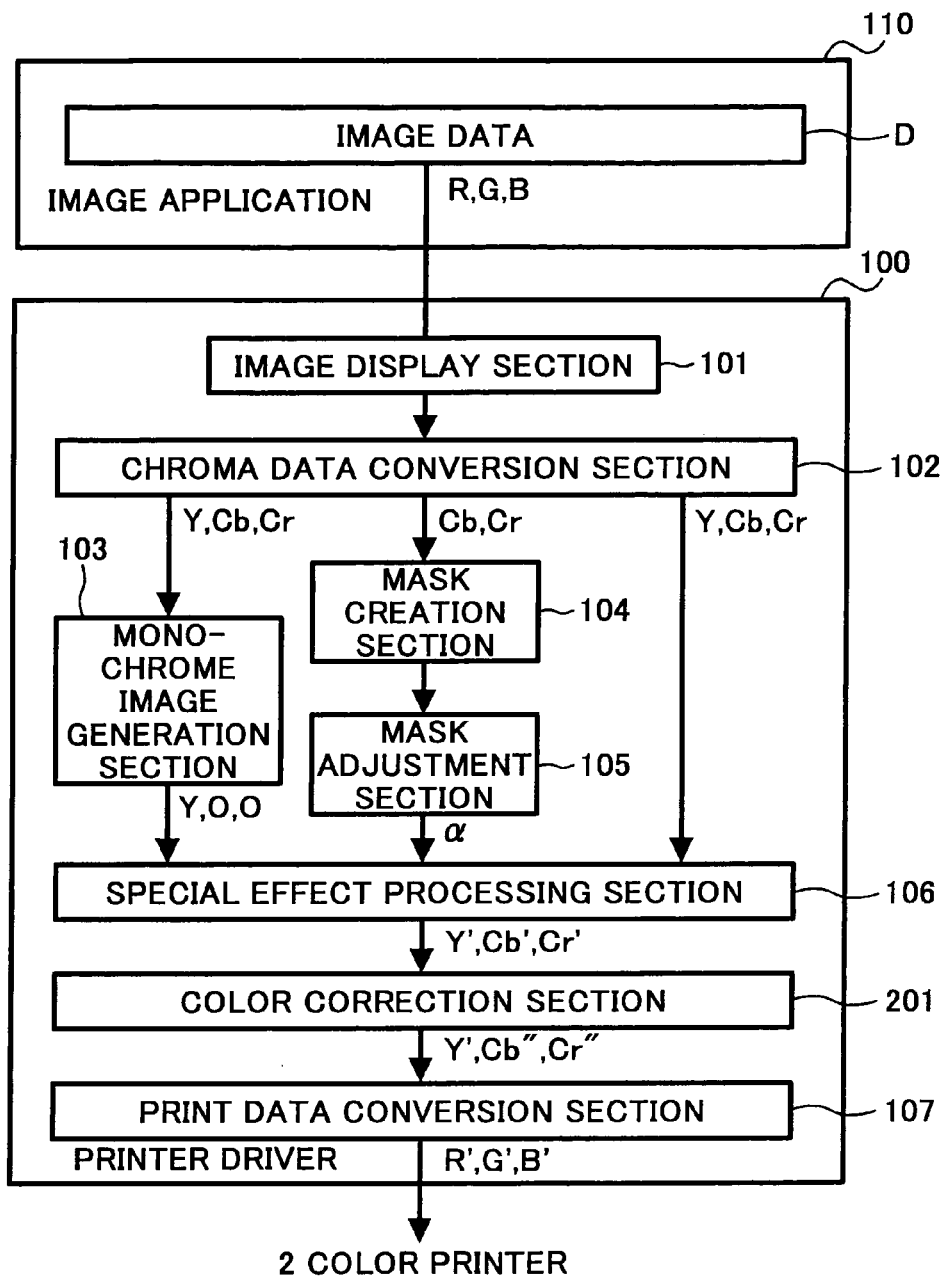

METHOD OF AND APPARATUS FOR IMAGE PROCESSING, AND COMPUTER PRODUCT

BACKGROUND OF THE INVENTION

1) Field of the Invention

The present invention relates to a method of and an apparatus for performing a special effect processing to an image.

2) Description of the Related Art

Various techniques for processing color images have been proposed. For example, image processing techniques such as lightness adjustment, contrast adjustment or hue correction are known. To process an image is also referred to as "to apply a special effect processing".

As one of such special effect processing, there is a processing for designating a specific color among full colors of a full-color image, printing only the specific color and printing the other colors as a monochrome image (which processing will be referred to as "designated color printing"). The designated color printing highlights the portion(s) with the specific color and so has a relatively wide range of utilization. For example, the designated color printing is used to highlight a color of a lipstick in an advertisement, such as on a poster to make an impact on the viewer of the poster. The lips of a woman model in the poster are printed in color and the rest of the poster is printed in monochrome.

Conventionally, the special effect processing is performed on a computer using dedicated software and the processed image is printed with a color printer. For example, Photoshop (trademark) manufactured by Adobe System Corporation may be used to perform the special effect processing. Photoshop has various other special effect functions in addition to the designated color printing explained above.

However, the softwares that are dedicated for the special effect processing are relatively expensive and difficult to operate. Therefore, there is a drawback that the dedicated software requires a skilled operator.

Further, there is known a two-color separation plate which can designate two-color separation on a printer driver and which separate two colors using an arbitrary ordinary application software (see, for example, Patent Document 1: Japanese Patent Application Laid-Open Publication No. 2001-197324).

According to the two-color separation plate, however, if specific color printing for printing only colors of a monochrome-base image in colors is performed, the apparatus can deal with up to two colors, i.e., black+one color. To express a second color such as red or blue, it is disadvantageously necessary to separately prepare a red or blue specific ink. Besides, whenever one specific color to be used has to be changed, it is disadvantageously necessary to change the ink.

SUMMARY OF THE INVENTION

It is an object of the present invention to provide a method of and an apparatus which can easily realize a color printing special processing which has a relatively wide range of utilization. It is also an object of the present invention to provide a computer program for allowing a computer to execute the method according to the present invention.

The image processing apparatus, which performs a special effect processing to image data of a colored image, has a lightness conversion unit that converts the image data into data containing at least a chroma component to obtain chroma component image data, a masking unit that determines a hue that is to be color-output in the chroma component image data, an image generation unit that converts the chroma component image data into monochrome image data expressed in black and white, an elimination unit that removes data from the monochrome image data corresponding to a portion of the colored image that has the hue determined by the masking unit to obtain image eliminated data, a combining unit that combines the image eliminated data and image data corresponding to a portion of the colored image that has the hue determined by the masking unit to obtain an image processed data, and a print driver that converts the image processed data into data that can be printed on a color printer.

The image processing method, which performs a special effect processing to image data of a colored image, includes converting the image data into data containing at least a chroma component to obtain chroma component image data, determining a hue that is to be color-output in the chroma component image data, converting the chroma component image data into monochrome image data expressed in black and white, removing data from the monochrome image data corresponding to a portion of the colored image that has the determined hue to obtain image eliminated data, combining the image eliminated data and image data corresponding to a portion of the colored image that has the determined hue to obtain an image processed data, and converting the image processed data into data that can be printed on a color printer.

The computer program according to the present invention makes a computer realize the image processing method according to the present invention.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 6 shows a conversion matrix table used by a chroma data conversion section shown in FIG. 5;

FIG. 7 shows a conversion matrix table used by a monochrome image generation section shown in FIG. 5;

FIG. 8 shows a conversion matrix table of a print data conversion section shown in FIG. 5;

FIG. 18 is a functional block diagram of a printer driver according to the third embodiment;

FIG. 19 shows a conversion matrix table used by a color correction section shown in FIG. 18;

DETAILED DESCRIPTIONS

Exemplary embodiments of the present invention will be explained hereinafter in detail with reference to the accompanying drawings.

Figure 1:
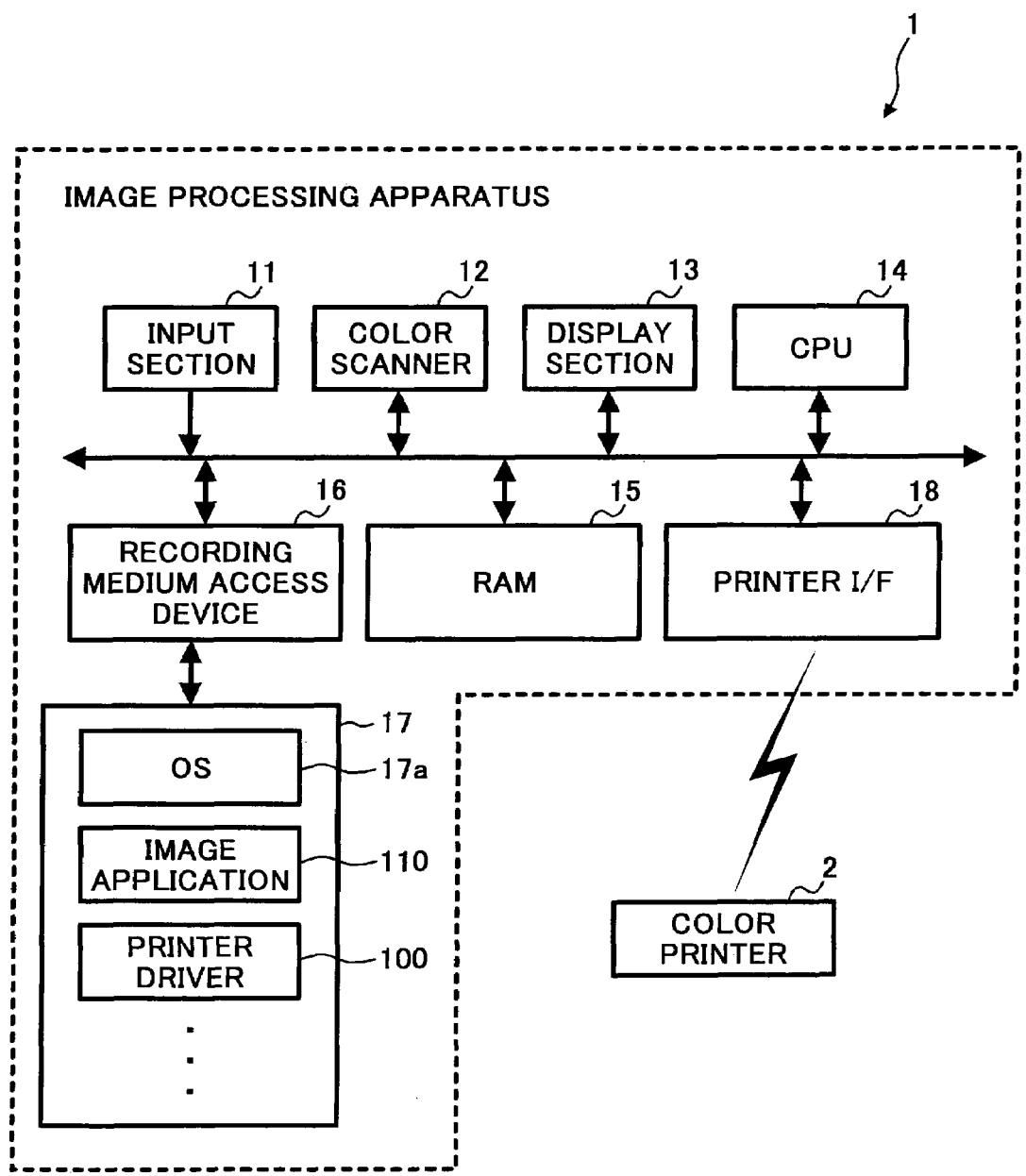
FIG. 1 is a block diagram which shows the configuration of a color printer system according to the first embodiment of the present invention.

FIG. 1 is a block diagram which shows the configuration of a color printer system in the first embodiment. A reference symbol 1 denotes an image processing apparatus according to the present invention. The image processing apparatus 1 is, for example, a personal computer. Reference symbol 2 denotes a color printer which is connected to the image processing apparatus 1 over wireless communication or wire communication.

The image processing apparatus 1 applies a special print processing to color image data to create a monochrome image from portions other than a specific color of the image data with the specific color left as it is, and outputs the image data thus subjected to the special print processing to the color printer 2. The color printer 2 prints out the input image data subjected to the special print processing.

The image processing apparatus 1 consists of an input section 11 which inputs data, a color scanner 12, a display section 13, a central processing unit (hereafter "CPU 14") which controls the entire apparatus 1, a random access memory (hereinafter "RAM 15") which is used as a work area of the CPU 14, a recording medium access device 17 which reads and writes data stored in a recording medium 17, the recording medium 17 that stores various types of programs for operating the CPU 14, and a printer interface (hereinafter "I/F 18") which interfaces with the color printer 2.

The input section 11 is, for example, a keyboard which includes cursor keys, number input keys, various functional keys, and the like, and a pointing device, such as a mouse or a slice pad, which makes key selection or the like on the display screen of the display section 13. The input section 11 acts as a user interface through which an operator issues operation instructions to the CPU 14 and also inputs data.

The color scanner 12 reads a color image, and acquires digital image data of red (hereinafter "R"), green (hereinafter "G"), and blue (hereinafter "B").

The display section 13 consists of a cathode ray tube (hereinafter "CRT"), a liquid crystal display (hereinafter "LCD") or the like, and displays data or images according to an instruction from the CPU 14. The printer I/F 18 is an interface through which the image processing apparatus 1 transmits and receives data to and from the color printer 2.

The CPU 14 is a central processing unit which controls the overall apparatus 1 in accordance with the programs stored in the recording medium 17. The input section 11, the display section 12, the RAM 15, the recording medium access device 16, and the printer I/F 18 are connected to this CPU 14. The CPU 14 controls data communication, read of an application program by accessing a memory, read/write of various pieces of data, input of data/commands, display and the like.

The RAM 15 is a work memory which stores application programs, instructions, data, results of the image processing and the like, and a display memory which temporarily stores display data displayed on the display screen of the display section 13.

The recording medium 17 stores therein various programs and data such as an OS program 17a (e.g., Windows2000 (trademark)) which can be executed by the CPU 14, an image application 110 for fetching an image by the color scanner 12 and for image formation, editing and the like, a printer driver 100 corresponding to the color printer 2. The recording medium 17 may be an optical, magnetic or electrical recording media. Floppy disks, hard disks, CD-ROM's, DVD-ROM's, magneto-optical disk (hereinafter "MO"), and personal computer (hereinafter "PC") cards are the example of the recording medium 17. The various programs are stored in the recording medium 17 in a data format readable by the CPU 14. The various programs are sometimes recorded in the recording medium 17 in advance or downloaded through a communication line and stored therein. In addition, the various programs can be delivered through the communication line.

A processing executed by the CPU 14 in accordance with the image application 110, and that executed by the CPU 14 in accordance with the printer driver 100 will now be explained while assuming that the image application 110 and the printer driver 100 mainly operate.

Figure 2:
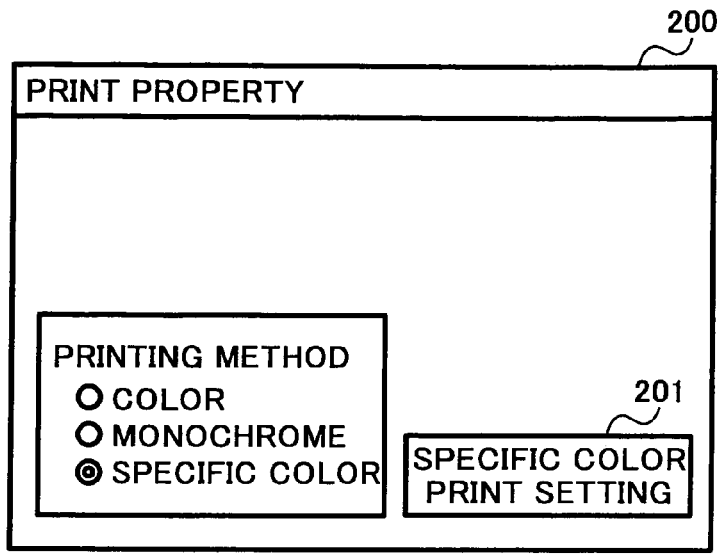
FIG. 2 shows a print property screen according to the first embodiment.

In the image processing apparatus 1, if the image application 110 displays color image data on the display section 13 and edits a color image (not shown), and an operator selects a button (not shown) to select a print property screen, the print property screen of the printer driver 100 is displayed on the display section 13. FIG. 2 shows one example of the print property screen. If the operator selects a "specific color print setting" button 200a on the property screen 200, the printer driver 100 displays a specific color print setting screen on the display section 13.

Figure 3:
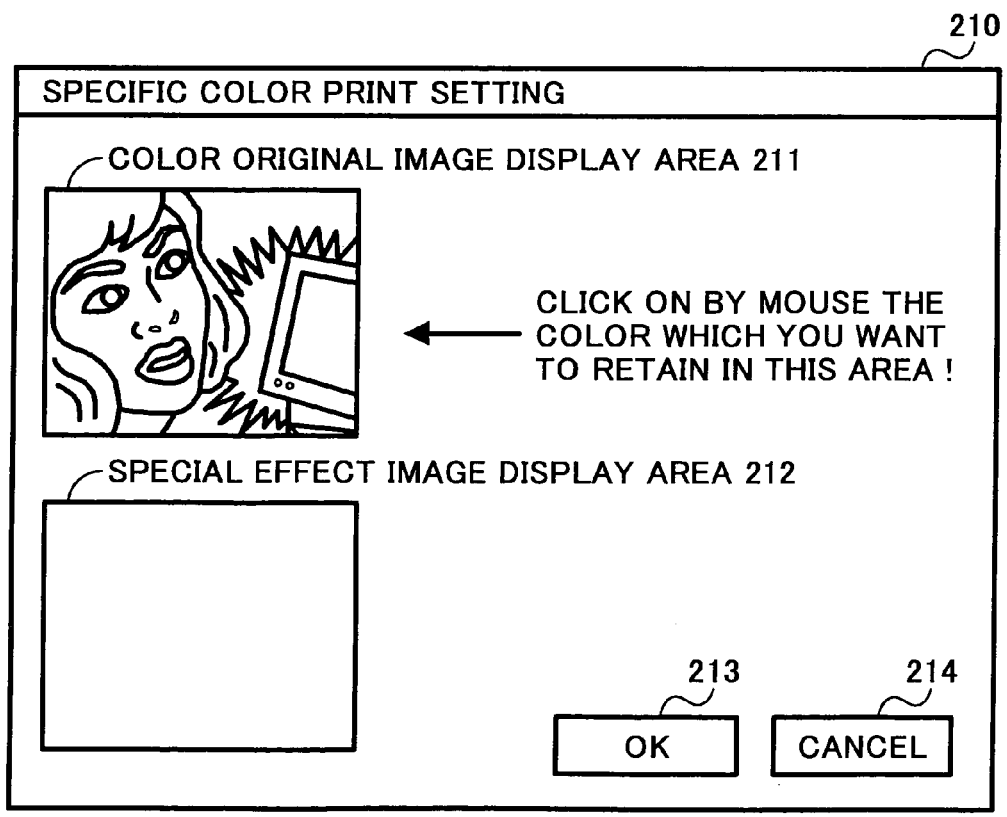
FIG. 3 shows one example of a specific color print setting screen according to the first embodiment.

FIG. 3 shows one example of the specific color print setting screen. As shown in FIG. 3, the specific color print setting screen 210 includes a color original image display area 211 in which the color image data created by the image application 110 is displayed, a special effect image display area 212 in which color image data to which a special effect has been applied is displayed, and a "cancel" button 214 used to cancel conditions set on the screen.

Figure 4:
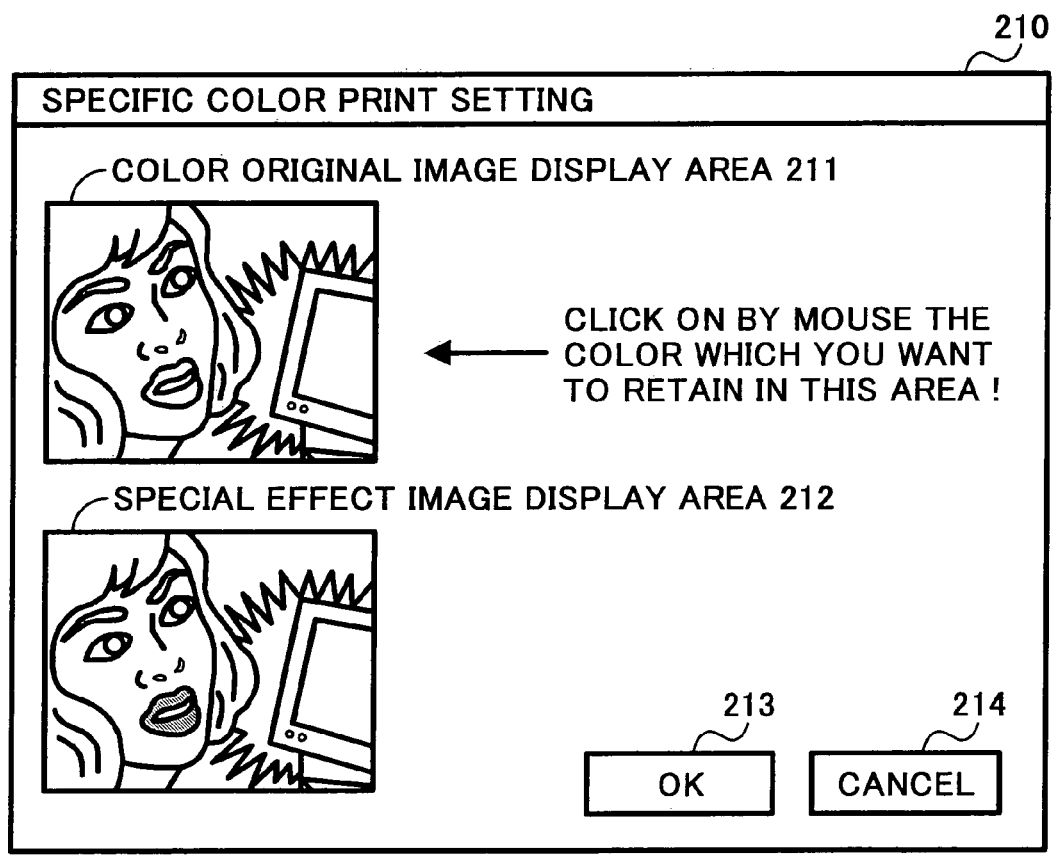
FIG. 4 shows one example of the specific color print setting screen according to the first embodiment.

The operator clicks, with the mouse etc., on a point that he wants to print with colors (a point of a color which the operator wants to retain) in the image data displayed in the color original image display area 211 to designate the color. The printer driver 100 generates image data to which a special effect processing is applied so as to create a color image only from the specific color (hue) of the designated point and to create a monochrome image from the remaining colors, and, as shown in FIG. 4, displays the image data thus special effect processed in the special image display area 212. The operator checks the image data displayed in the special image display area 212. If the operator clicks on an "OK" button 213 on the specific color print setting screen 210, the printer driver 100 outputs the special effect processed image data to the color printer 2 through the printer I/F 18.

Figure 5:
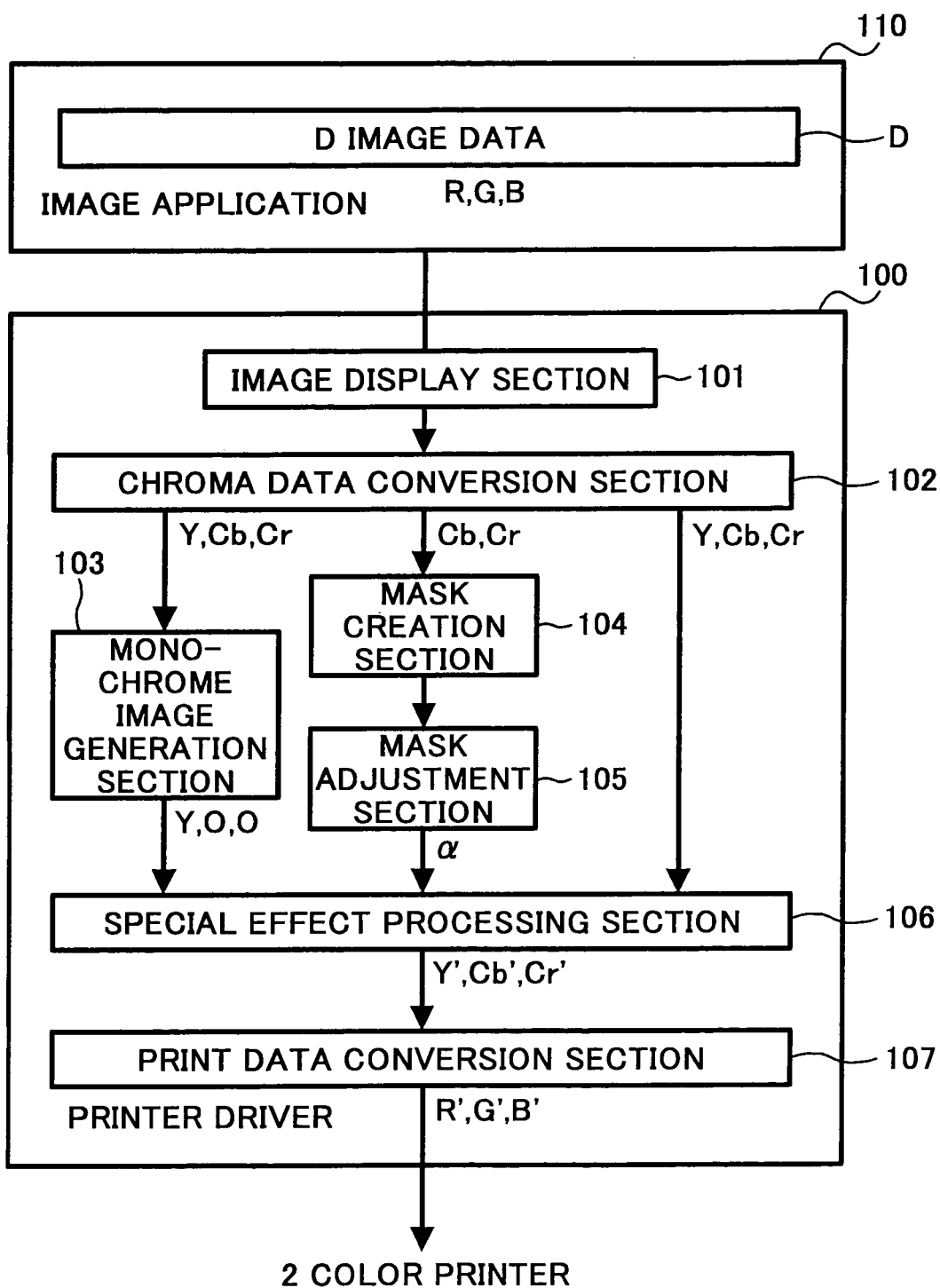
FIG. 5 is a functional block diagram of a printer driver shown in FIG. 1.

FIG. 5 is a functional block diagram of the printer driver 100. A reference symbol 110 denotes an image application for inputting color image data D on R, G and G into the printer driver 100. The image data D of a color image generated by the image application 110 is input into the printer driver 100. At this time, the image data is data expressed by respective colors of R, G and B.

The printer driver 100 includes an image display section 101, a chroma data conversion section 102, a monochrome image generation section 103, a mask creation section 104, a mask adjustment section 105, a special effect processing section 106, and a print data conversion section 107. The image display section displays the specific color print setting screen 210 on the display section 13. The chroma data conversion section 102 converts the image data into data which contains at least a chroma component. The monochrome image generation section 103 converts the image data into monochrome image data expressed by black and white. The mask creation section 104 and the mask adjustment section 105 determine the hue of a specific color to be color-output in the image data from the chroma component thus generated. The special effect processing section 106 eliminates data corresponding to the hue determined by the mask creation section 104 and the mask adjustment section 105 from the monochrome image data, synthesizes the monochrome image data from which the data is eliminated with data on the specific color determined by the mask creation section 104 and the mask adjustment section 105 in the image data, and displays the synthesized image data on the specific color print setting screen 210. The print data conversion section 107 re-converts the image data synthesized by the special effect processing section 106 into data (R, G, B) which can be printed, and outputs the data to the color printer 2.

After the image data D is generated and the operator selects a print property screen, the image application 110 displays the print property screen as shown in FIG. 2 on the display section 13. If the operator selects the "specific color print setting" button 200a, the image data D is input, as the R, G and B data, into the printer driver 100.

The printer driver 100 maps the input R, G and B image data to the RAM 15. The image display section 101 displays the specific color print setting screen 210 as shown in FIG. 3, and displays the image data D in the color original image display area 211 of the specific color print setting screen 210. The operator clicks a point to be color-output in the image data displayed in the color original image display area 211 by the mouse and designates the point. In this embodiment, the image data D is also referred to as "original image data" which means image data which is not subjected to the special effect processing.

The chroma data conversion section 102 converts the original image data (R, G, B) into a lightness Y, a chroma Cb (a chroma from an achromatic color to blue), and a chroma Cr (a chroma from an achromatic color to red). The conversion of the chroma data conversion section 102 is performed based on a conversion color matrix table shown in FIG. 6.

The converted image data of the lightness and the chromas, is input into both the monochrome image generation section 103 and the special effect processing section 106. The Cb and Cr which represent chroma among the lightness and chroma, are input into the mask generation section 104. The monochrome image generation section 103 converts the image data using a conversion matrix table shown in FIG. 7, and generates monochrome image data from the lightness and chromas. In addition, the mask generation section 104 and the mask adjustment section 105 calculate a value α (where $0 \leq \alpha \leq 1$) which represents a mask from the chroma of the point that is clicked by the operator by the mouse in the image data displayed in the color original image display area 211.

The original image data, the monochrome image data, and the value α are input into the special effect processing section 106. The special effect processing section 106 obtains image data Vmix subjected to the special effect processing, using the image data, the monochrome image data and the value α in accordance with the following equation, $$Vmix = [\text{monochrome image data} \times (1-\alpha)] + (\text{original image data} \times \alpha) \quad (1).$$

The special effect processing section 106 displays the special effect processed image data Vmix in the special effect image display area 212 on the specific color print setting screen 210. The special effect processed image data Vmix is input into the print data conversion section 107, and inversely converted using a conversion matrix shown in FIG. 8. As a result of inverse conversion, the image data Vmix is converted into image data expressed by R, G and B (which will be denoted by R', G' and B' to differentiate them from the R, G and B image data input from the application in FIG. 5). The print data conversion section 107 outputs the R', G' and B' image data to the color printer 2 through the printer I/F 18. The color printer 2 converts the R', G' and B' image data into image data of C, M, Y and K and then prints the C, M, Y and K image data on a sheet.

The processing performed by the mask creation section 104 and the mask adjustment section 105 among the processing explained above will be explained particularly hereafter.

(1) Processing of Mask Creation Section

Figure 9A:
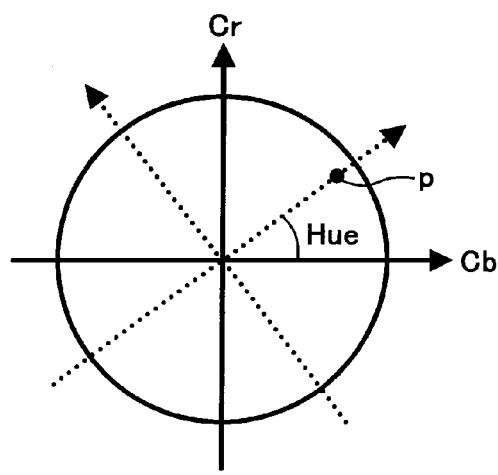
FIGS. 9A and 9B are explanatory views for the processing of a mask creation section shown in FIG. 5.
Figure 9B:
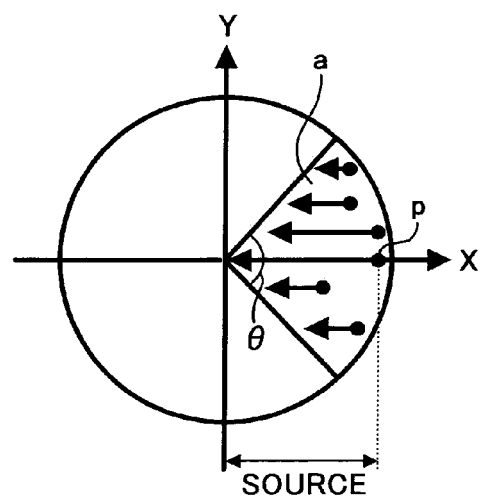

FIGS. 9A and 9B are explanatory views for the processing of the mask creation section 104. The mask creation section 104 includes a Cb-Cr coordinate with a horizontal axis which indicates the Cb representing the chroma of the image data and a vertical axis which indicates the Cr. On the coordinate, the mask creation section 104 draws a point p which is determined by the chromas $Cb_p$ and $Cr_p$ which indicate a color (specific color) to be color-printed among the chromas Cb and Cr input from the chroma data conversion section 102.

The mask creation section 104 calculates a hue (Hue) from the chroma $Cb_p$ and $Cr_p$ based on the following equation (2). Specifically, the hue is determined based on the chroma $Cb_p$ and $Cr_p$ designated by the operator using the mouse in the image data displayed in the color original image display area 211 (see FIG. 3).

$$\text{Hue} = \arctan(Cb_p/Cr_p) \quad (2)$$

The mask creation section 104 rotates the Cb-Cr coordinate by as much as the calculated Hue, thus setting an X-Y coordinate shown in FIG. 9. In accordance with the coordinate conversion from the Cb-Cr coordinate into the X-Y coordinate, the point $(Cb_p, Cr_p)$ is moved to a point (x, 0) on the X axis. The value x is referred to as "source" which is used to calculate a value α1 so as to determine the value α based on the following equation (3), $$\alpha 1 = \text{source}/100(\%) \quad (3)$$

In this case, the maximum value on the X axis shown in FIG. 9B is a value obtained by setting the maximum quantity of data for outputting one color in the image data at 100.

The specific color to be color-output often has a distribution in an image photographed particularly by a digital camera. Taking this respect into consideration, an angle θ about the X axis is set as shown in FIG. 9B in this embodiment, and the "source" of a color with each hue included in a range a in a sector specified by the angle θ is also determined. The "source" of each color is a movement quantity of a point, which represents each color moved toward an origin along the X axis, expressed by X coordinate. The initial value of the angle θ of the sector is set at 45°.

Through the processing, the mask creation section 104 determines the hue of a specific color to be color-output in the image data from the chroma components Cb and Cr. Namely, a range a shows the range of the hue to be color-output in the color image. It is noted that the degree of a special effect processing applied to the image (degree of output of the specific color) to be explained later can be adjusted according to the magnitude of the range a.

Figure 10A:
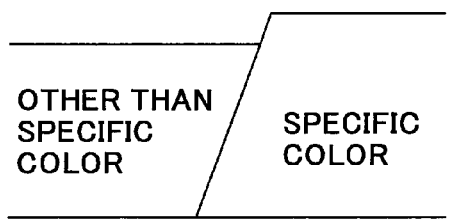
FIGS. 10A and 10B typically show a state in which a specific color is eliminated from colors contained in an image.
Figure 10B:
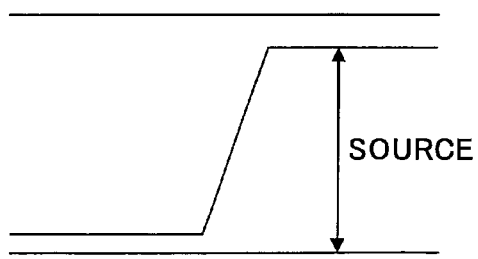

FIGS. 10A and 10B typically show a state in which the specific color thus set by these processing is eliminated from the respective colors contained in the image. In FIGS. 10A and 10B, the vertical axis is "source" % and the horizontal axis is hue.

(2) Mask Adjustment

The mask adjustment of the mask adjustment section 105 for adjusting the mask which is created by the method explained above, will next be explained. If a mask is created by the above method, chroma components enough to perform a special effect processing cannot be sometimes obtained, depending on the relationship among the type of the image, the specific color, and colors around the specific color. If so, the portion of the specific color in the printed image has a halftone and an appropriate image cannot be sometimes obtained. To avoid such a defect, the value α1 is adjusted to adjust the degree of output of the specific color of the image in this embodiment. The value α is obtained by adjusting α1 based on the following equation (4), $$\alpha = GAIN \times (\alpha1 - CLIP) \quad (4).$$

Figure 11A:
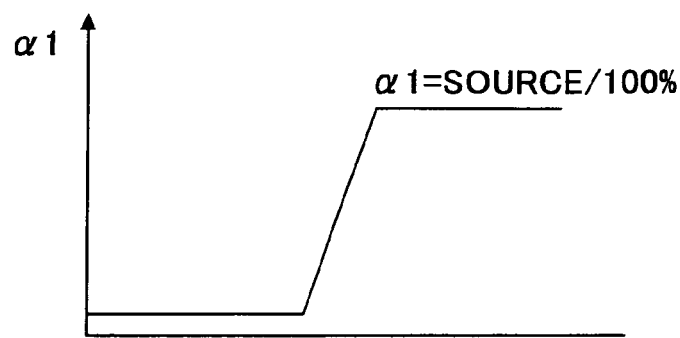
FIGS. 11A to 11C are explanatory views for parameters.
Figure 11B:
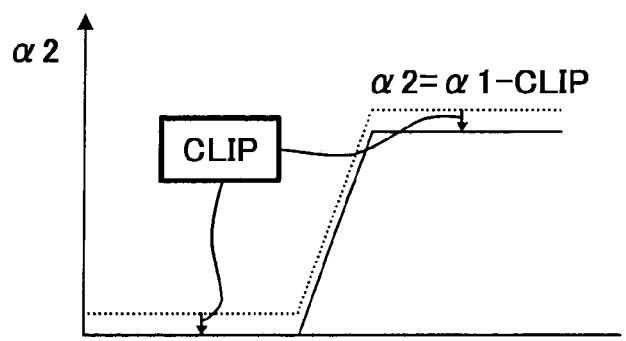
Figure 11C:
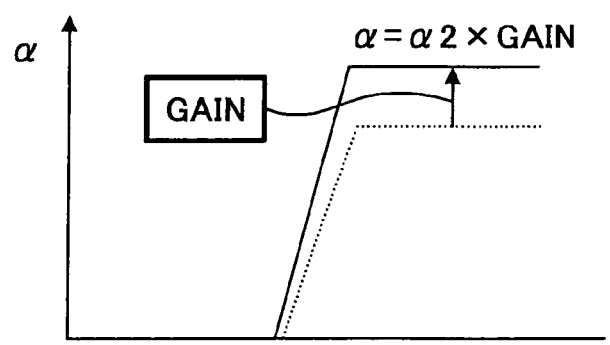

In the equation (4), CLIP and GAIN are parameters for adjusting the degree of the special effect. FIGS. 11A to 11C are explanatory views for the parameters CLIP and GAIN. Specifically, FIG. 11A is an explanatory view for α1. FIG. 11B is an explanatory view for a value α2 obtained by subtracting CLIP from α1 (bracket in the equation (4)). FIG. 11C is an explanatory view for α obtained by multiplying α2 by GAIN. In FIGS. 11A to 11C, the vertical axis indicates numerical values such as α1 and α, and the horizontal axis indicates respective colors of an entire image. As shown therein, by subtracting CLIP from α1, the value α1 for a color which differs greatly in chroma from the specific color can be set smaller and only the value α obtained by multiplying α2 by GAIN for the specific color can be set larger.

As for the value α1 calculated in the equation (3), if the value of the image data on the specific color in the image data is αB, the parameters CLIP and GAIN are expressed as shown in equations (5) and (6), respectively, $$CLIP = 1.0 - \alpha B \quad (5)$$

$$GAIN = 1.0 / \alpha B \quad (6)$$

Needless to say, the values of CLIP and GAIN are initial values and can be finely adjusted after executing the special effect processing. The mask adjustment section 105 calculates the parameters CLIP and GAIN based on the equations (5) and (6), respectively, and then calculates α based on the equation (4). It is thus possible to automatically calculate α.

The mask is created using the value α obtained by these processing and the mask is applied to the original data, whereby the colors other than the specific color can be eliminated from the original image data. From this, the determination of α1 will be also referred to as "mask creation", and the determination of a by adjusting α1 will be referred to as "mask adjustment". In addition, the mask created by using a will be referred to as "α mask".

Figure 12:
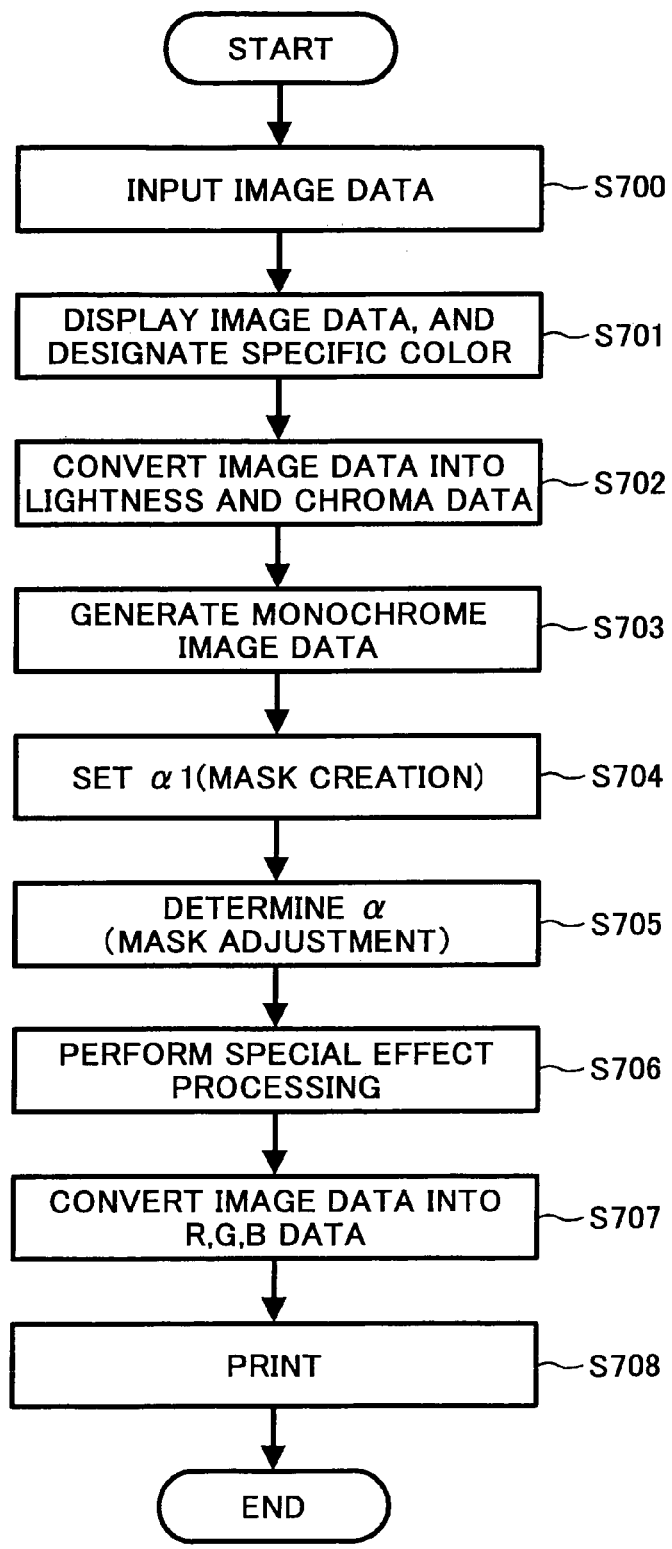
FIG. 12 is a flow chart which explains an image processing method according to the first embodiment.
Figure 13:
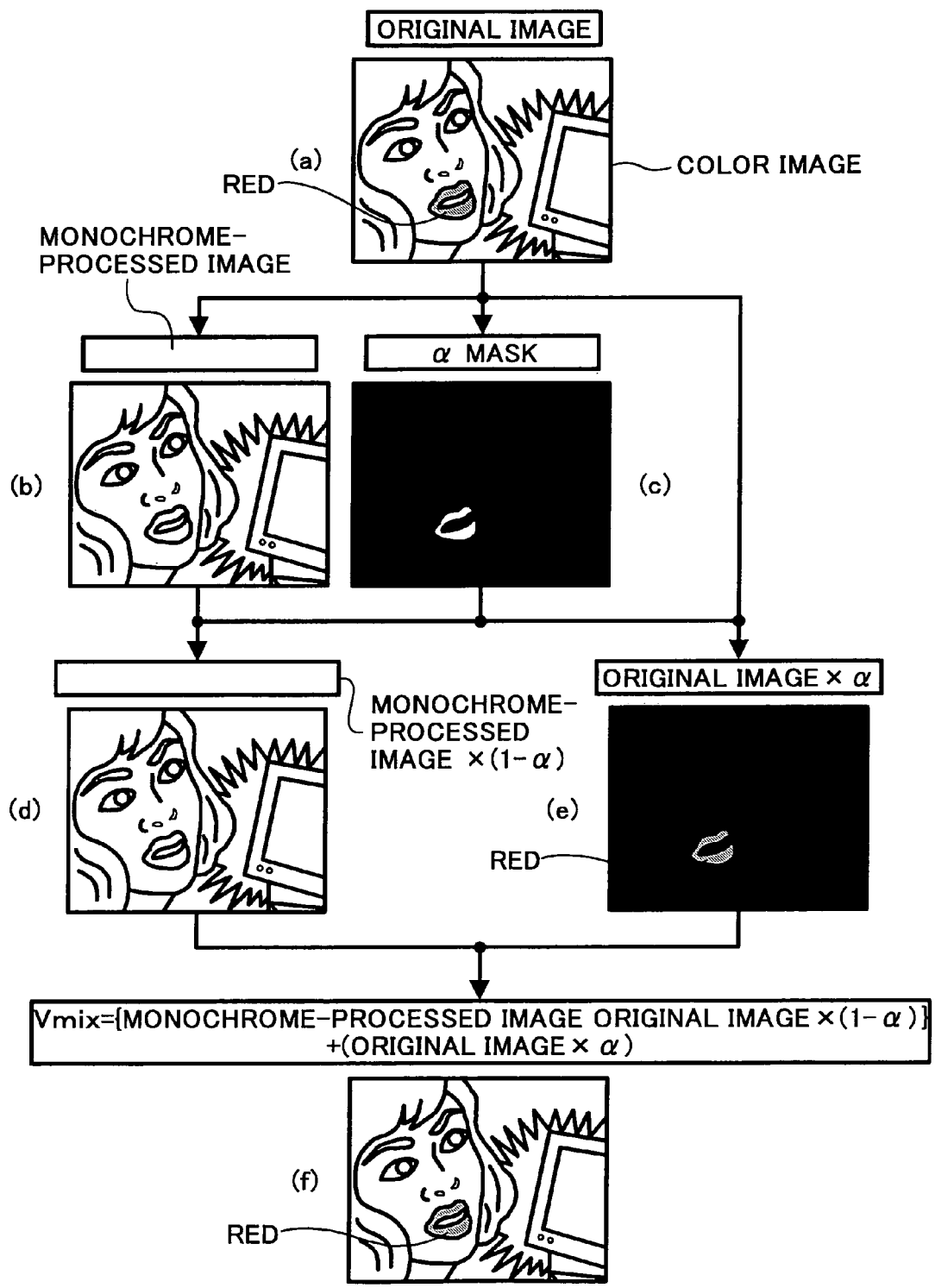
FIG. 13 explains the various steps in the image processing according to the first embodiment.

FIG. 12 is a flow chart which explains an image processing method for the image processing apparatus in the first embodiment. FIG. 13 explains various steps in the image data processing method according to the first embodiment. The image processing method for the image processing apparatus in the first embodiment will be explained hereinafter with reference to FIGS. 12 and 13.

As shown in FIG. 12, the printer driver 100 inputs color image data first (step S700). This image data is original image data which is not subjected to a special effect processing yet. An original image generated from the original image data is shown in FIG. 13 (see (a)). It is assumed herein that the original data contains R, G and B of 8 bits (0 to 255), respectively.

The printer driver 100 then displays the specific color print setting screen 210, shown in FIG. 3, on the display section 13, and displays the image data D in the color original image display area 211. The operator clicks by mouse a point to be color-output in the image data displayed on the color original image display area 211, thereby designating a specific color (step S701). A specific color is designated, for example, by clicking on lips by the mouse. It is assumed herein that the part of lips of the original image data has R=100%.

The chroma data conversion section 102 converts the original image data (R, G, B) into the lightness component Y and the chroma components Cb and Cr (step S702). The original image data is subjected to a monochrome processing by the monochrome image generation section 103 and converted into monochrome image data (step S703). FIG. 13 shows the monochrome processed image (see (b)). The monochrome processed image is an image containing black and white with 8 bits, respectively, and the lip part has, for example, 76/255.

Further, the printer driver 100 represents the chroma components Cb and Cr on the Cb-Cr coordinate by the mask creation section 104, and obtains α1 for determining the hue of the specific color part designated by the mouse (step S704). The mask adjustment section 105 adjusts α1 and thereby determines α (step S705). The monochrome image data, the value α and the original image data are input into the special effect processing section 106. The special effect processing section 106 creates an α mask based on the value α, and applies the α mask to the original image data.

FIG. 13 shows data indicating the α mask (see (c)). The α mask is image data in which only the positions of the colors in the range of the specific color are shown and the remaining parts are expressed in black. The special effect processing section 106 eliminates the data indicated by the mask from the monochrome image data, and obtains data for generating an image shown in FIG. 13 (see (d)). The lip part has 0/255 (MAX of black). In addition, by applying the α mask to the original image data, the special effect processing section 106 generates image data on an image, shown in FIG. 13 (see (e)), in which only the colors in the range of the specific color are shown as colors, obtains image data for generating an image, shown in FIG. 13 (see (f)), subjected to the special effect processing based on the equation (1), and displays the image data thus obtained on the special effect image display area 212 on the specific color print setting screen 210 (step S706). The lip part has R=100%.

The print data conversion section 107 converts the image data on the image subjected to the special effect processing into image data represented by R, G and B (step S707), outputs the image data of R, G and B to the color printer 2, and printed (step S708).

As explained so far, according to the first embodiment, the chroma data conversion section 102 converts the image data into data which at least contains chroma components. The monochrome image generation section 103 converts the image data into monochrome image data expressed in black and white. The mask creation section 104 and the mask adjustment section 105 determine the hue of the specific color to be color-output in the image data based on the chroma components of the point designated by the operator in the image data. The special effect processing section 106 eliminates data corresponding to the hue determined by the mask creation section 104 and the mask adjustment section 105 from the monochrome image data, and synthesizes the monochrome image data, from which the data corresponding to the hue is eliminated, with the data on the specific color determined by the mask creation section 104 and the mask adjustment section 105 in the image data. Therefore, it is possible to easily realize the color print special processing which has a relatively wide range of utilization, and which expresses only the specific color in the color image in color and expresses the remaining parts in black and white, in the apparatus.

The mask adjustment section 105 adjusts the degree of output of the hue. It is, therefore, possible to adjust the degree of the output of the specific color of an image.

The specific color expressed in a color, in a color image is designated by the operator in the image displayed on the display section 13 using the mouse. It is, therefore, possible to facilitate designating the specific color.

For reference, according to the patent document 1, it is necessary to separately prepare a specific color ink such as red or blue so as to express a second color like red or blue. According to the present invention, the second color can be expressed using cyan, magenta and yellow which are process colors of the color printer 2. According to the patent document 1, whenever the specific color to be used changes, it is necessary to exchange an ink to an ink for the color to be used. According to the present invention, by contrast, since the process colors of the color printer 2 are used, it is advantageously unnecessary to exchange one type of ink to another.

An image processing apparatus in the second embodiment will be explained with reference to FIGS. 14 and 15. In the image processing apparatus according to the first embodiment, the specific color of the image data is designated by pointing the specific color. On the other hand, in the image processing apparatus according to the second embodiment, hue is designated using a hue bar displayed on a screen, instead of designating the specific color, and only the designated hue is shown in color and other hues are shown as monochrome in the color image.

The hardware configuration of the image processing apparatus and the function and configuration of the printer driver in the second embodiment are the same as those in the first embodiment (see FIGS. 1 and 5). Therefore, only the sections different from those in the first embodiment will be explained herein.

Figure 14:
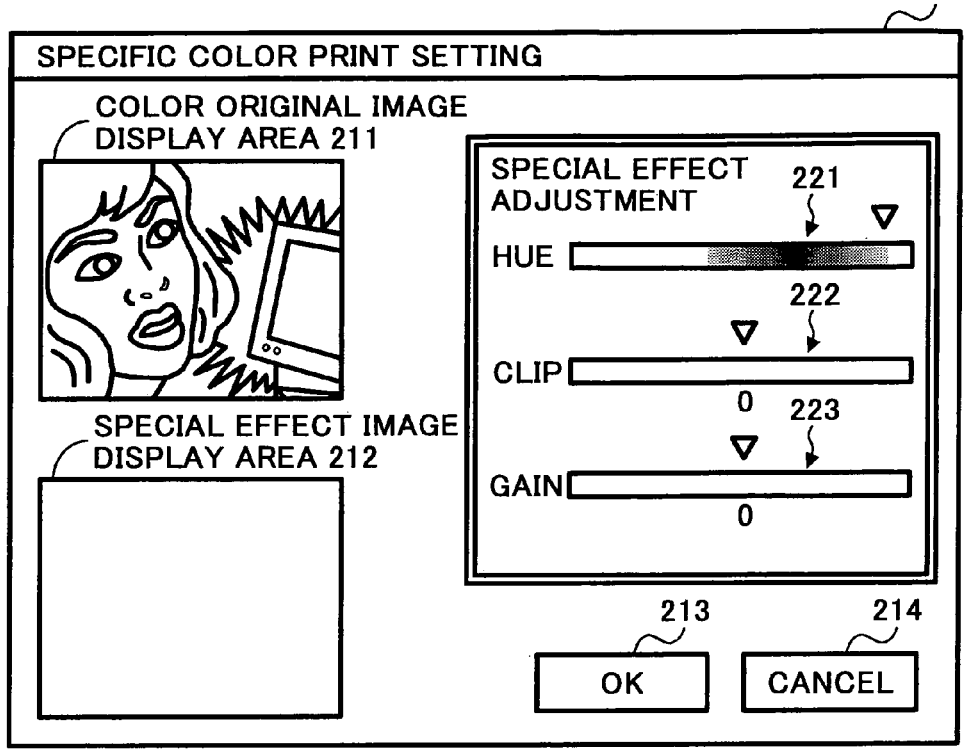
FIG. 14 shows one example of a specific color print setting screen according to the second embodiment of the present invention.

FIG. 14 shows one example of a specific color print setting screen 210 in the second embodiment. The specific color print setting screen 210 differs from the specific color print setting screen 210 shown in FIG. 4 in that a hue bar 221 for designating hue, a CLIP bar 222 for designating the parameter CLIP, and a GAIN bar 223 for designating the parameter GAIN are additionally provided. Using the hue bar 221, the CLIP bar 222, and the GAIN bar 223, the operator moves a cursor Δ by a pointing device such as a mouse, whereby the hue, CLIP and GAIN are designated at the cursor position. FIG. 15 shows one example in which image data subjected to a special effect processing is displayed in the special effect image display area 212.

Figure 15:
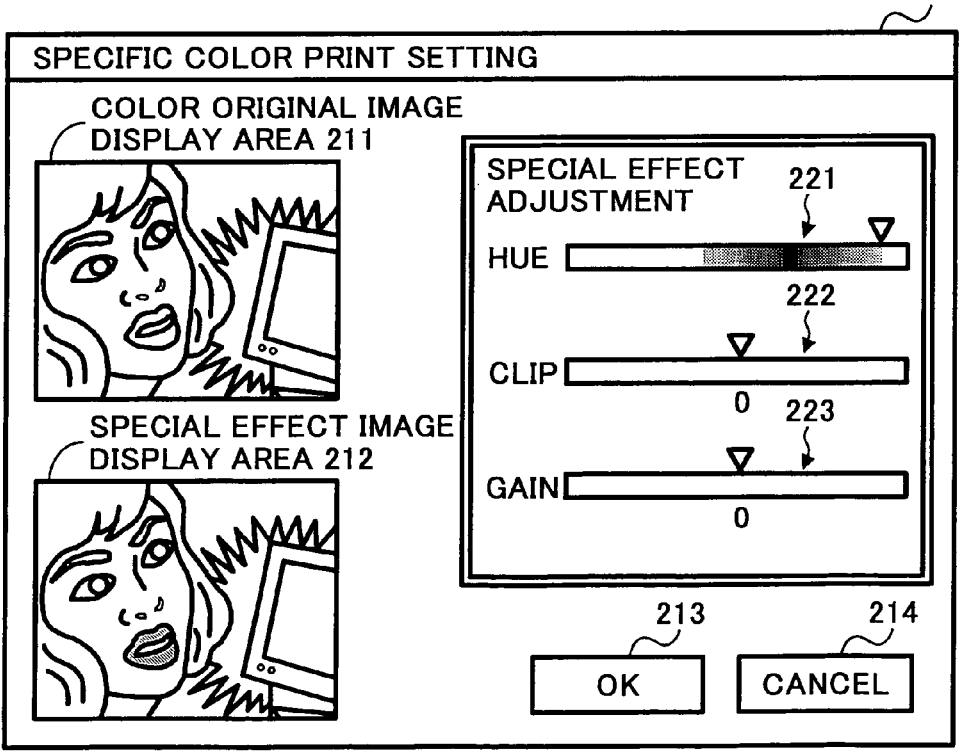
FIG. 15 shows one example of the specific color print setting screen in the second embodiment.

In FIG. 15, the image display section 101 displays the specific color print setting screen 210 as shown in FIG. 3, and displays image data D in a color original image display area 211 on the screen 210. A mask creation section 104 sets a hue designated at the cursor position of the hue bar 221 shown in FIG. 15. A mask adjustment section 105 sets parameters CLIP and GAIN designated by the cursor positions of the CLIP bar 222 and the GAIN bar 213, respectively, and calculates α based on the equation (4). Since the other processing are the same as those in the first embodiment, they will not be explained herein.

As explained above, according to the second embodiment, the hue expressed by color printing in the color image is designated by the hue bar 221 on the special color print setting screen 210. It is possible to easily designate a hue expressed by color printing in a color image.

An image processing apparatus in the third embodiment will be explained with reference to FIGS. 16 to 21G. The image processing apparatus in the third embodiment differs from the image processing apparatus in the first embodiment in that a color correction function to color-correct the chroma components of image data which has been subjected to a special effect processing, is additionally provided. The hardware configuration of the image processing apparatus in the third embodiment is the same as that in the first embodiment (see FIG. 1).

Figure 16:
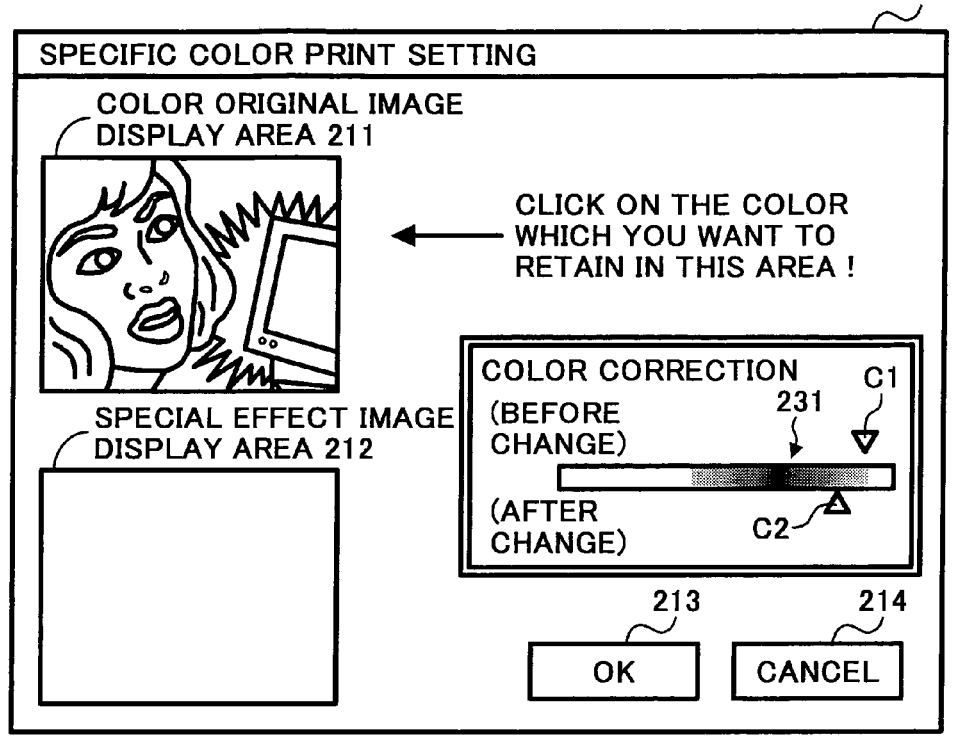
FIG. 16 shows one example of a specific color print setting screen according to the third embodiment of the present invention.
Figure 17:
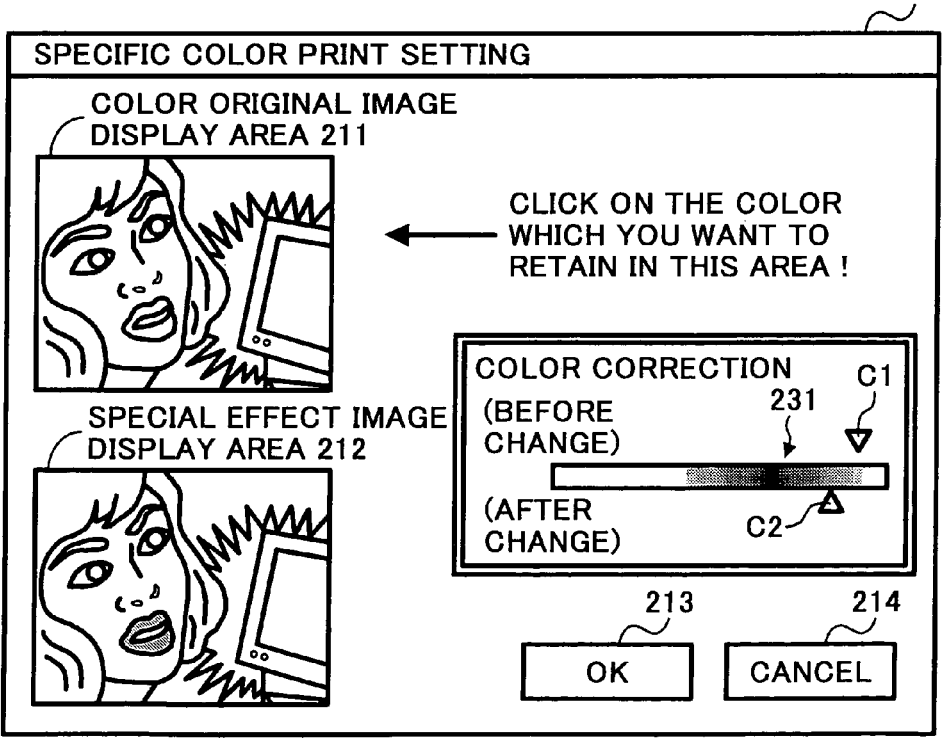
FIG. 17 shows one example of the specific color print setting screen according to the third embodiment.

FIG. 16 shows one example of a specific color print setting screen in the third embodiment. The specific color print setting screen 210 shown in FIG. 16 differs from that shown in FIG. 3 in that a color correction bar 231 used for color correction is additionally provided. On this color correction bar 231, hues are displayed, a cursor C1 is displayed at the position of the hue of a specific color is displayed, and a cursor C2 for correcting a hue is displayed. If an operator designates the position of the cursor C2 by operating a mouse, a printer driver 100 changes the hue designated by the cursor C2 to a hue of the chroma component of special effect processed image data. FIG. 17 shows an example in which the special effect processed image is displayed in a special effect image display area 212.

FIG. 18 is a functional block diagram of the printer driver of the image processing apparatus in the third embodiment. The printer driver 100 shown in FIG. 18 differs from that shown in FIG. 5 in that a color correction section 210 which corrects the chroma components of special effect processed image data is additionally provided. In FIG. 18, sections that have same or similar configuration and perform same or similar functions as the sections shown in FIG. 5 are denoted by the same reference symbols and, their detail explanation will be omitted to avoid simple repetition of matter.

An image display section 101 displays the specific color print setting screen 210 shown in FIG. 3, and image data D is displayed in the color original display area 211 on the screen 210. Image data Vmix which has been subjected to a special effect processing is input from a special effect processing section 106 into the color correction section 201. The color correction section 201 converts the chroma components Cb' and Cr' of the special effect processed image data Vmix into chroma components Cb" and Cr", respectively, using a conversion matrix show in FIG. 19, thereby making color correction. In FIG. 19, θ denotes a rotation angle for rotating an original hue to a hue designated by the cursor C2 of the color correction bar 231 shown in FIG. 9A. The color correction section 201 displays the image data thus color-corrected in the special effect image display area 212 on the specific color print setting screen 210.

Figure 20:
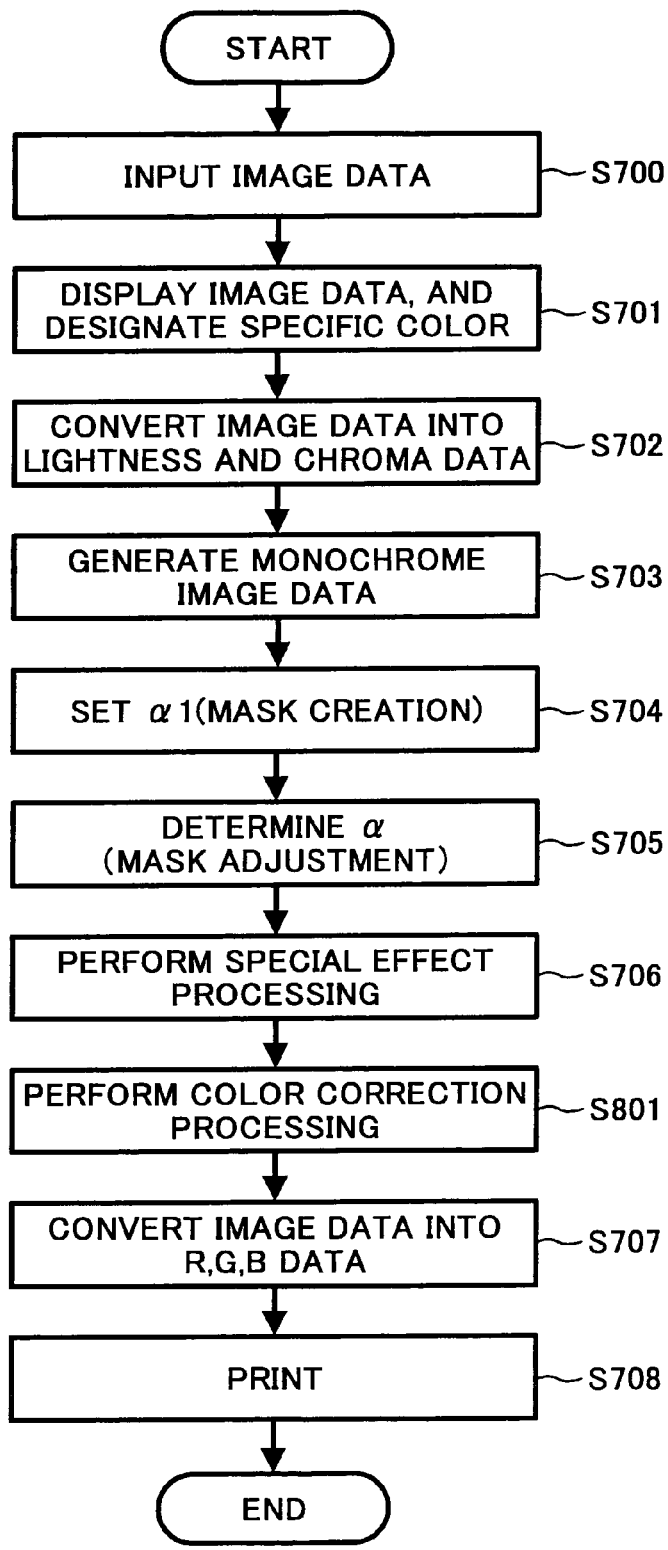
FIG. 20 is a flow chart which explains an image processing method in the third embodiment.
Figure 21A:
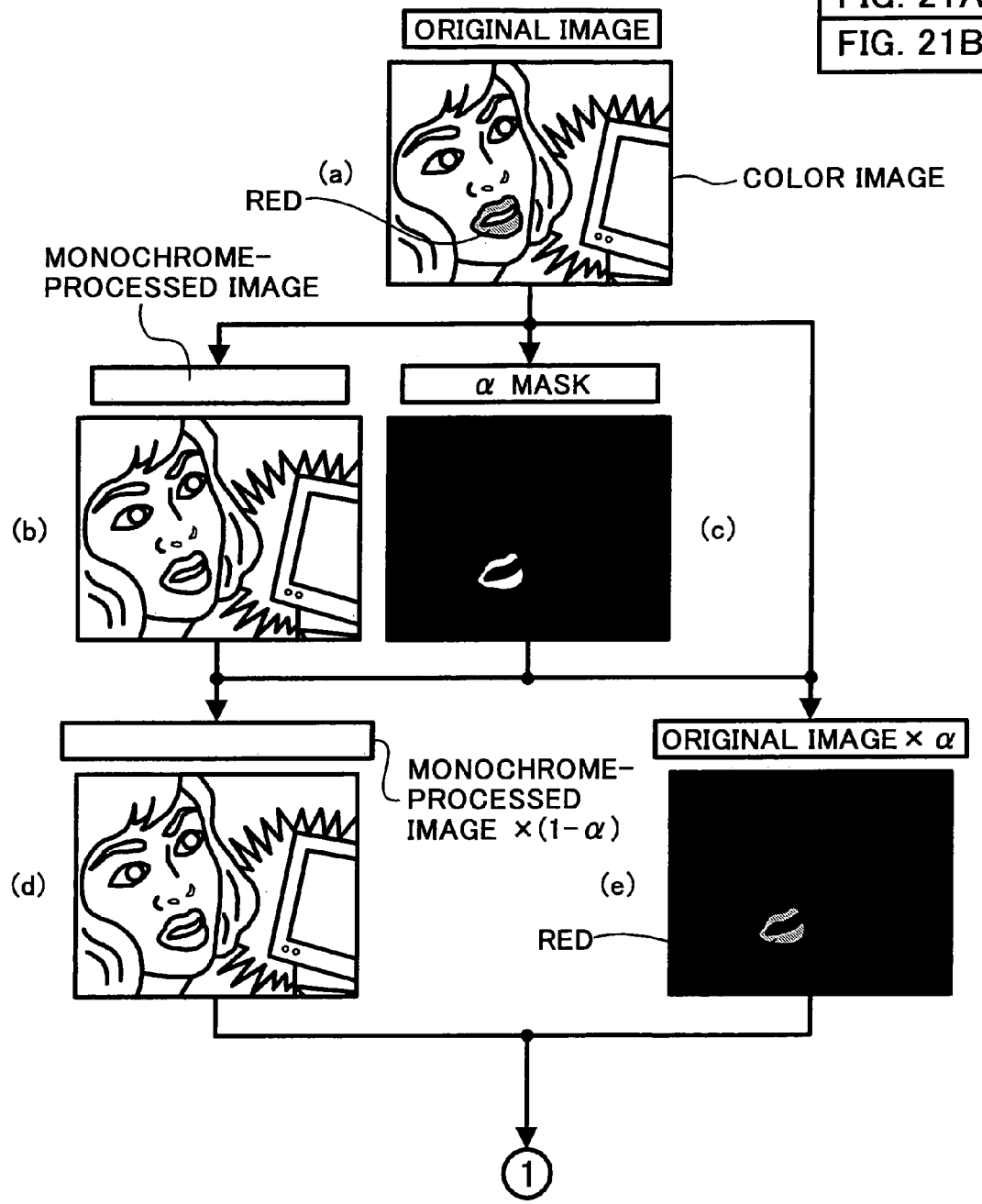
FIG. 21 explains the various steps in the image processing according to the third embodiment.
Figure 21B:
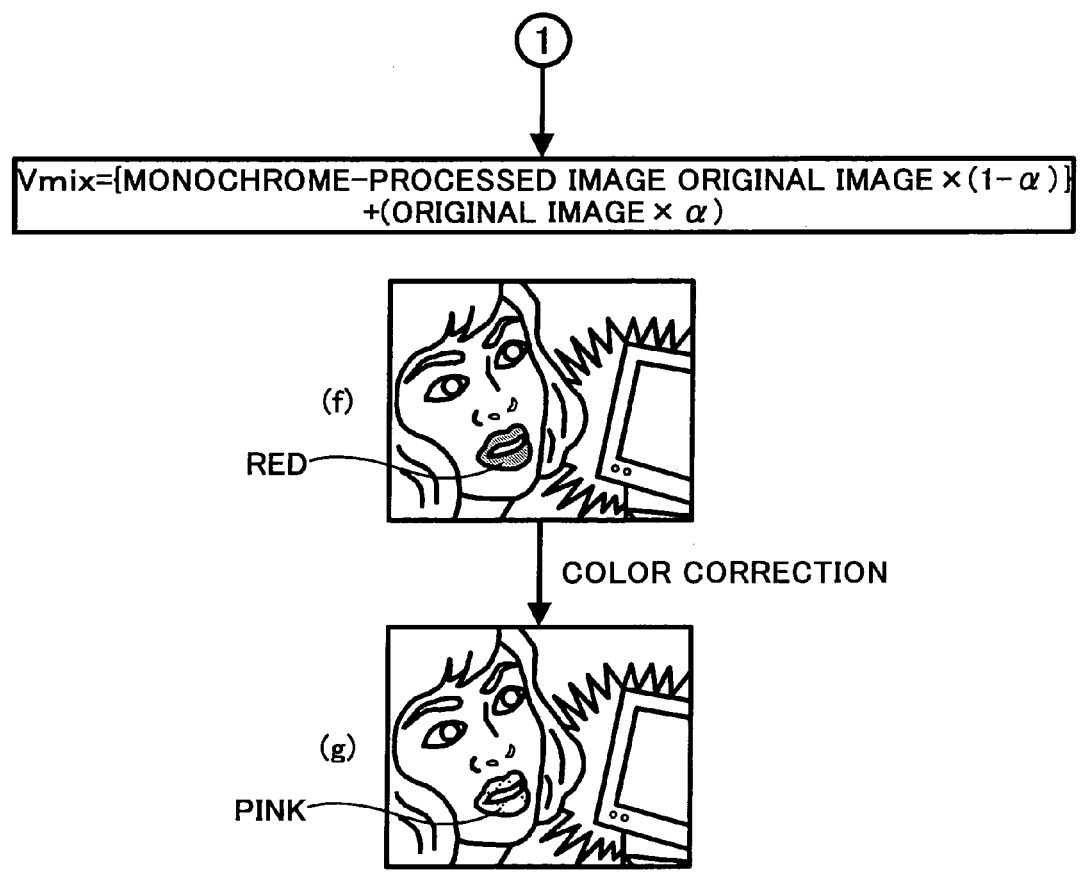

FIG. 20 is a flow chart which shows the steps of an image processing method for the image processing apparatus in the third embodiment. FIG. 21 explain various steps in the image data processing method. The image processing method according to the third embodiment will be explained with reference to FIGS. 20 and 21. In FIG. 20, steps at which the same or similar processing is performed as the steps shown in FIG. 12 are denoted by the same reference symbols and, will not be explained to avoid simple repetition of matter. In FIG. 21, sections subjected to the same or similar processing as those shown in FIG. 13 are denoted by the same reference symbols and, will not be explained to avoid simple repetition of matter.

In FIG. 20, the color correction section 201 converts the chroma components of the image data which is subjected to a special effect processing by the special effect processing section 106 (step S706) into a hue at a position designated by the cursor C2 of the color correction bar 231 on the specific color print setting screen 210, shown in FIG. 17, and displays the image data thus color-corrected in the special effect image display area 212 on the specific color print setting screen 210 (step 801). FIG. 21 (see (g)) shows the color-corrected image in which the color of a lip part is changed from red to pink, for example.

The print data conversion section 107 converts the color-corrected image data into image data represented by R, G and B (step S707), outputs the image data of R, G and B to a color printer 2 and prints the image (step S708).

As explained so far, according to the third embodiment, the color correction section 201 converts the chroma components of the image data which has been subjected to the special effect processing by the special effect processing section 106 into the designated hue, thereby making color correction. It is, therefore, possible to adjust the color-printed color.

It is noted that the present invention is not limited to the embodiments explained above but can be carried out by appropriately modifying the invention within the scope of the invention.

According to the image processing apparatus of one aspect of this invention, it is possible to facilitate forming an image in which only the specific hue is displayed similarly to the original image (color image) in a monochrome image. Therefore, it is possible to provide an image processing apparatus which can easily realize the color print special effect processing, that has a relatively wide range of utilization, which expresses only the specific color in the color image in a color and which expresses the other parts in black and white.

Moreover, since the mask adjustment unit which adjusts an output degree of the hue is provided, it is possible to make the state of the image obtained as a result of the image processing as an operator imagine.

Furthermore, it is possible to facilitate creating a mask.

Moreover, it is possible to further facilitate expressing only the specific color in the color image in a color.

Furthermore, it is possible to adjust a color-printed color to a desired color.

Moreover, it is possible for an operator to check a special effect processed image.

Furthermore, it is advantageously possible for an operator to check a color-corrected image.

Moreover, it is advantageously possible to facilitate determining a hue to be color-output.

Furthermore, it is advantageously possible to facilitate determining a hue to be color-output.

According to the image processing method of another aspect of this invention, it is possible to easily realize the color print special effect processing, which has a relatively wide range of utilization, which expresses only the specific color in the color image in a color and which expresses the other parts in black and white.

According to the computer program which allows a computer to execute the image processing method of the present invention, it is to speedily and automatically realize the image processing method on a computer.

The present document incorporates by reference the entire contents of Japanese priority documents, 2001-374923 filed in Japan on Dec. 7, 2001, 2002-112455 filed in Japan on Apr. 15, 2002 and 2002-327446 filed in Japan on Nov. 11, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus that performs a special effect processing to image data of a colored image, the image processing apparatus comprising:
    a lightness conversion unit that converts the image data into data containing at least a chroma component to obtain chroma component image data;
    a masking unit that determines a hue that is to be color-output in the chroma component image data;
    an image generation unit that converts the chroma component image data into monochrome image data expressed in black and white;
    an elimination unit that removes data from the monochrome image data corresponding to a portion of the colored image that has the hue determined by the masking unit to obtain image eliminated data;
    a combining unit that combines the image eliminated data and image data corresponding to a portion of the colored image that has the hue determined by the masking unit to obtain an image processed data; and
    a print driver that converts the image processed data into data that can be printed on a color printer.

2. The image processing apparatus according to claim 1, wherein the masking unit includes a mask adjustment unit which adjusts an output degree of the hue.

3. The image processing apparatus according to claim 2, wherein
    the masking unit calculates the hue as $$\text{Hue} = \arctan(Cb_p/Cr_p),$$

where ($Cb_p$, $Cr_p$) denotes a point P of a specific color to be color-printed on a Cb-Cr coordinate with a horizontal axis indicating a chroma Cb and a vertical axis indicating a croma Cr, the mask adjustment unit sets an X-Y coordinate by rotating the Cb-Cr coordinate by as much as the calculated hue, and moves the point ($Cb_p$, $Cr_p$) to a point p(x, 0) on an X axis by coordinate conversion from the Cb-Cr coordinate to the X-Y coordinate, if a value of the x is source, α value α1 for determining a value a which represents a mask is calculated as α1=source/100(%), and the value α which represents the mask is calculated as

α=GAIN×(α1−CLIP), where CLIP and GAIN are parameters.

4. The image processing apparatus according to claim 3, wherein
the elimination unit generates the image eliminated data by monochrome image data×(1−α),
the mask adjustment unit adjusts the hue as image data×α, and
the combining unit generates the image processed data as

[monochrome image data×(1−α)]+[image data×α].

5. The image processing apparatus according to claim 1, further comprising a color correction unit that performs color correction with respect to the image processed data by changing the chroma component of the image processed data, wherein
the print driver converts the color corrected image processed data into data that can be printed on a color printer.

6. The image processing apparatus according to claim 1, further comprising:
a display unit; and
a display control unit that orchestrates the display unit to display the image processed data.

7. The image processing apparatus according to claim 5, further comprising:
a display unit; and
a display control unit that orchestrates the display unit to display the color corrected image processed data.

8. The image processing apparatus according to claim 1, further comprising:
a display unit;
a display control unit that orchestrates the display unit to display the image data; and
a pointing unit with which an operator indicates a hue on the image data displayed on the display unit, wherein
the masking unit determines the hue designated by the operator as the hue to be color-output.

9. The image processing apparatus according to claim 1, further comprising:
a display unit, and
a display control unit that orchestrates the display unit to display a hue selection area for selecting a hue for an operator; and
a pointing unit with which the operator indicates a hue in the hue selection area displayed on the display unit, wherein
the masking unit determines the hue designated by the operator as the hue to be color-output.

10. An image processing method of performing a special effect processing to image data of a colored image, the image processing method comprising:

convening the image data into data containing at least a chroma component to obtain chroma component image data;

determining a hue that is to be color-output in the chroma component image data;

converting the chroma component image data into monochrome image data expressed in black and white;

removing data from the monochrome image data corresponding to a portion of the colored image that has the determined hue to obtain image eliminated data;

combining the image eliminated data and image data corresponding to a portion of the colored image that has the determined hue to obtain an image processed data; and converting the image processed data into data that can be printed on a color printer.

11. A program storage device readable by a computer and tangibly embodying a program of instructions executable by the computer to execute an image processing method of performing a special effect processing to image data of a colored image, said image processing method comprising:

convening the image data into data containing at least a chroma component to obtain chroma component image data;

determining a hue that is to be color-output in the chroma component image data;

converting the chroma component image data into monochrome image data expressed in black and white;

removing data from the monochrome image data corresponding to a portion of the colored image that has the determined hue to obtain image eliminated data;

combining the image eliminated data and image data corresponding to a portion of the colored image that has the determined hue to obtain an image processed data; and convening the image processed data into data that can be printed on a color printer.

12. The program storage device according to claim 11, further comprising adjusting a degree of the hue that is to be color-output.

13. The program storage device according to claim 11, wherein
when determining the hue, the hue is calculated as Hue=arctan($Cb_p$/$Cr_p$), where ($Cb_p$, $Cr_p$) denotes a point P of a specific color to be color-printed on a Cb-Cr coordinate with a horizontal axis indicating a chroma Cb and a vertical axis indicating a croma Cr, adjusting a degree of the hue, an X-Y coordinate is set by rotating the Cb-Cr coordinate by as much as the calculated hue, and the point ($Cb_p$, $Cr_p$) is moved to a point p(x, 0) on an X axis by coordinate conversion from the Cb-Cr coordinate to the X-Y coordinate, if a value of the x is source, a value α1 for determining a value α which represents a mask is calculated as α1=source/100(%), and the value α which represents the mask is calculated as

α=GAIN×(α1−CLIP), where CLIP and GAIN are parameters.

14. The program storage device according to claim 13, wherein
at the removing step, the image eliminated data is generated by $$\text{monochrome image data} \times (1-\alpha),$$

when adjusting a degree of the hue, the hue is adjusted as $$\text{image data} \times \alpha, \text{ and}$$

at the combining step, the image processed data is generated as $$[\text{monochrome image data} \times (1-\alpha)] + [\text{image data} \times \alpha].$$

15. The program storage device according to claim 11, further comprising performing color correction with respect to the image processed data by changing the chroma component of the image processed data, wherein
at the converting step, the image processed data is converted into data that can be printed on a color printer.

16. The program storage device according to claim 11, further comprising:
displaying the image processed data.

17. The program storage device according to claim 15, further comprising:
displaying the color corrected image processed data.

18. The program storage device according to claim 11, further comprising:
displaying the image data for an operator; and
the operator pointing a desired hue on the displayed image data, wherein
when determining the hue, the hue pointed by the operator is determined as the hue to be color-output.

19. The program storage device according to claim 11, further comprising:
displaying the image data and a hue selection area for selecting the hue for an operator; and
the operator selecting a desired hue in the displayed hue selection area, wherein
when determining the hue, the hue selected by the operator is determined as the hue to be color-output.

* * * * *